US007261478B2

(12) United States Patent
Marowski et al.

(10) Patent No.: US 7,261,478 B2
(45) Date of Patent: Aug. 28, 2007

(54) SYSTEMS AND METHODS FOR HANDLING DEFECTIVE RFID MEDIA ACCORDING TO AVAILABLE PRINTER OUTPUT OPTIONS

(75) Inventors: Raymond Michael Marowski, Lexington, KY (US); David John Mickan, Lexington, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 329 days.

(21) Appl. No.: 11/100,020

(22) Filed: Apr. 6, 2005

(65) Prior Publication Data

US 2006/0228153 A1 Oct. 12, 2006

(51) Int. Cl.
*B41J 29/38* (2006.01)
*B65H 29/00* (2006.01)
*G06K 19/07* (2006.01)

(52) U.S. Cl. ........................ 400/76; 400/679; 399/397; 399/403

(58) Field of Classification Search ..................... None
See application file for complete search history.

(56) References Cited

U.S. PATENT DOCUMENTS 6,645,327 B2 11/2003 Austin et al.
2004/0081501 A1* 4/2004 Kobayashi et al. .... 400/120.01
2005/0230479 A1* 10/2005 Chapman et al. ...... 235/462.13

FOREIGN PATENT DOCUMENTS

JP 11250208 A * 9/1999
JP 2004070784 A * 3/2004
JP 2005022847 A * 1/2005

* cited by examiner

*Primary Examiner*—Daniel J. Colilla
(74) *Attorney, Agent, or Firm*—Navarro Law Offices, P.C.

(57) ABSTRACT

A printing device (10) such as a laser printer includes a radio frequency controller (38) which permits the detection and redirection of media having one or more defective radio frequency device tags, such as an RFID tag, to a specific one of two or more output options (50, 52). The radio frequency controller (38) may include radio frequency control logic (500) that communicates with the base printer (10) and the output options (50, 52) over a down port (506) and up port (508) to intercept commands from the printer (10) to the options (50, 52) and to also respond to such commands. A defective tag can be detected by attempting to program a tag using an RF reader/programmer (504).

26 Claims, 5 Drawing Sheets

SYSTEMS AND METHODS FOR HANDLING DEFECTIVE RFID MEDIA ACCORDING TO AVAILABLE PRINTER OUTPUT OPTIONS

TECHNICAL FIELD

Specific embodiments relate to systems for handling print media having one or more embedded radio frequency device tags. More particularly, the invention relates to systems and methods of separating pages of media containing defective or "bad" Radio Frequency Identification (RFID) tags from media having "good" tags during printing. Still more particular, the invention allows the separation of media having defective RFID tags without compromising the communications protocol between the core print engine and available output options.

BACKGROUND OF THE INVENTION

Inkjet and laser printers have become commonplace equipment in most workplace and home computing environments. Today, many printers are multi-functional assemblies capable of printing on a large array of print media including letterhead, paper envelopes and labels. A recent innovation in the printing industry involves the manufacturing of print media with embedded radio frequency signatures in the form of Radio Frequency Identification (RFID) transponders or tags. These tags, sometimes called "Smart Labels", may be used with a variety of existing printing methods.

Embedded print media generally comprises a backing material (sometimes referred to as the "web") upon which a label is applied, with a RFID tag sandwiched in between the label and the backing material. There may be one or more labels on the web and the sheet, as presented, may be part label and part plain paper. In some cases, there may be more than one tag arrayed across the width and down the length of the media such that multiple columns and/or rows of tags are contained on the print media.

Another similar type of embedded print media is known as "Smart Paper" in which RFID tags are embedded into the media without labels. One application for Smart Paper is in the area of secure document storage where access to information printed on a document is controlled by use of data control mechanisms such as Access Control List ("ACL") embedded in a tag on the media. To control access, a radio frequency reader/programmer situated near a control point, such as an access control cabinet, can check the ID of a user wanting to access the cabinet against the ACL on the tag on the media. If the ID of the user and the ACL do not match, an alarm can be invoked to notify of an attempted breach in security. In addition, the information on the ACL can be spread among a plurality of tags on a single sheet of print media to accommodate multiple accesses by multiple users and to save costs in the printed media.

One of the benefits of printing labels on a cut-sheet printer such as a laser or inkjet printer is that the relatively wide format allows for multiple columns of labels to be used. The use of multiple columns improves the overall rate at which the labels can be printed. At the same time, because the customer can print more than one label for each sheet printed, the relative cost of each label is greatly reduced.

Accordingly, printing on media with embedded RFID tags is rapidly becoming a growing area of label printing. Each tag on a sheet can be printed with certain data, and the RFID tag embedded within that media can be used to allow individualized processing of user associated data. For example, a shipping label might have the delivery address and a package tracking ID printed on it, while the corresponding tag would be programmed with the same information. The delivery information can then be read from the tag, whether or not the package is positioned so that the tag is visible.

In modern laser printing systems it is common to offer a variety of paper handling options at the output of the printer. Notably, the ability to direct each printed sheet uniquely to one of a selection of output bins is a commonly desired feature. To enable output bin selection, output bins may be added to the output section of the printer in a stackable, modular fashion.

In addition, each option device may have the ability to communicate with the printer's core engine processor via a communications interface commonly referred to as the "Paper Port". With some printing systems a variety of output options may be employed including a single output bin, a 5-bin multi-bin stacker, and a single-bin stapler "finishing option". When connected to the base printer, these options may be integrated into a complete printing system.

Printing label media with embedded RFID tags presents the additional problem of how to manage media with tags that have been damaged or are otherwise inoperable. While it is relatively straightforward to visually examine a printed page and detect gross defects with the printed output, a "bad" tag is difficult or impossible to distinguish from a "good" tag without attempting to electronically read and verify the tag's operation and content.

Laser printers have a key inherent characteristic that makes the detection and separation of media having defective tags a unique problem from existing thermal printer systems. With laser printers the page cannot be stopped or reversed during the printing operation without jeopardizing the quality of the printed image on the page. Therefore, it is desirable to find a method of distinguishing bad tags from good ones that does not require stopping the printing process. At the same time, it is also desirable that minimal modifications in either hardware or software be required of the base printer or existing options. Therefore, changing the existing communications protocol between engine and software, or providing additional signals to the options are not attractive options.

Therefore it is desirable for the RFID-capable printer to take some action when a bad or defective tag has been detected to make such pages easily distinguishable from other pages in the print stream that have good tags. A solution that can be offered as an after-market installable option to detect and separate media having defective RFID tags from good ones would provide numerous advantages.

BRIEF DESCRIPTIONS OF THE DRAWINGS

The present invention is illustrated by way of example and not limitation in the figures of the accompanying drawings in which like references indicate similar elements, and in which.

DETAILED DESCRIPTION

For simplicity the discussion below will use the terms "media", "sheet" and/or "paper" to refer to a discrete unit of recording media. It should be understood, however, that this term is not limited to paper sheets, and any form of discrete recording media is intended to be encompassed therein, including without limitation, envelopes, transparencies, postcards, labels, and the like.

Figure 1:
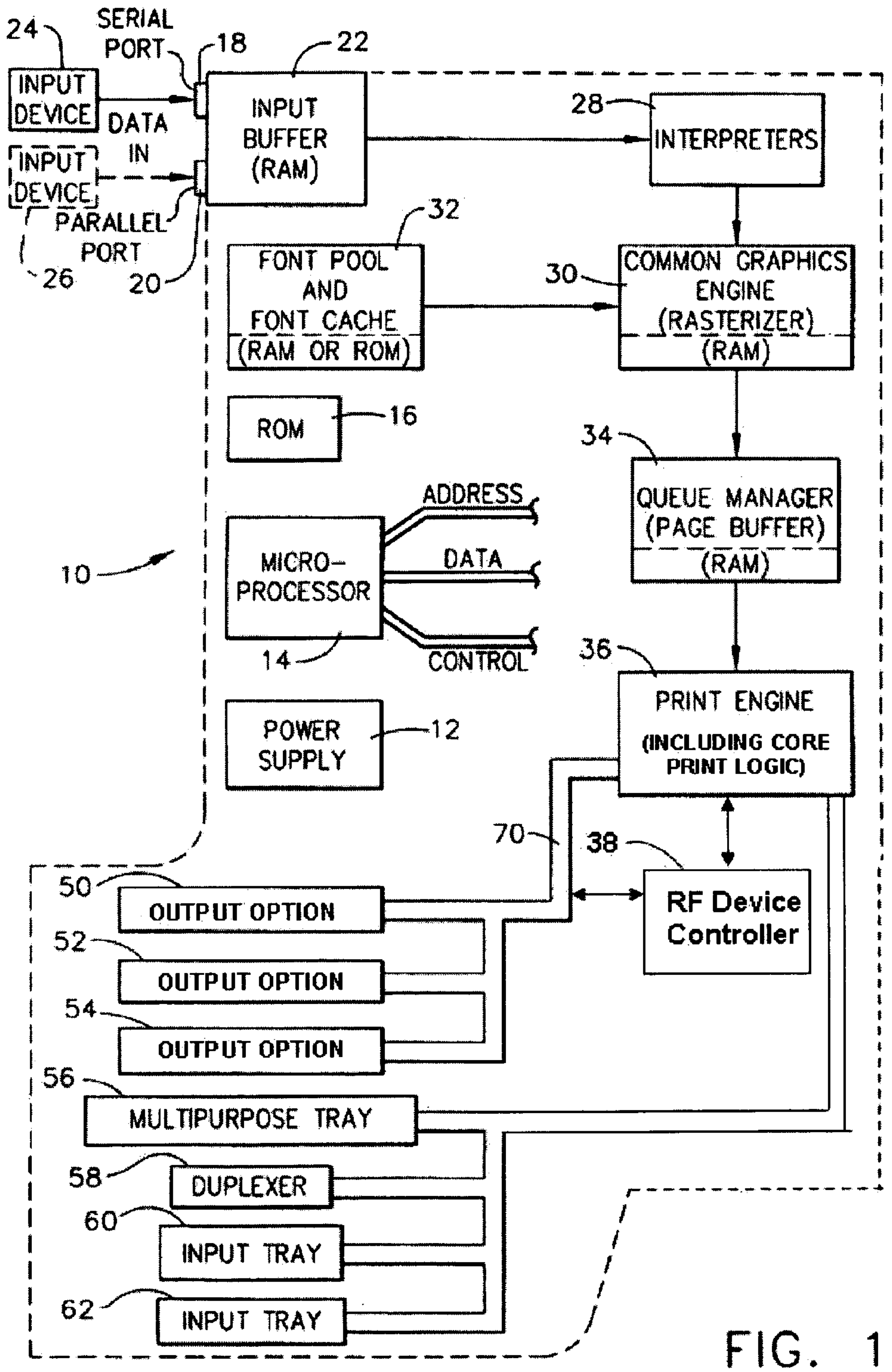
FIG. 1 is a block diagram of the major components of a laser printer, as constructed according to the principles of the present invention.

Referring now to the drawings, FIG. 1 shows a hardware block diagram of a printing device in the form of a laser printer, generally designated by the reference numeral 10, which is adapted for separating media having one or more defective radio frequency data storage devices from other media during a printing process according to the invention. The printer device 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided by software operations into several portions for performing several different functions.

Printing device 10 also contains at least one serial input or parallel input port, network or USB port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache may be stored, respectively, in ROM or RAM within most laser printers, and these font memories are designated by the reference numeral 32 on FIG. 1. Such font pools and caches may supply bitmap patterns for common alphanumeric characters so that the common graphics engine 30 can easily translate each such character into a bitmap using a minimal elapsed time.

Once the data has been rasterized, it is directed into a Queue Manager or page buffer, which is a portion of RAM designated by the reference numeral 34. In a typical laser printer, an entire page of rasterized data is stored in the Queue Manager during the time interval that it takes to physically print the hard copy for that page. The data within the Queue Manager 34 is communicated in real time to a print engine designated by the reference numeral 36. Print engine 36 includes a laser light source within its printhead (not shown), and its output 40 is the physical inking onto a piece of paper, which is the final print output from printing device 10.

It will be understood that the address, data, and control lines are typically grouped in buses, which are electrically conductive pathways that are physically communicated in parallel (sometimes also multiplexed) around the various electronic components within printing device 10. For example, the address and data buses are typically sent to all ROM and RAM integrated circuits and the control lines or interrupt lines are typically directed to all input or output integrated circuits that act as buffers.

Print engine 36 contains the core print logic which may be embodied in an Application Specific Integrated Circuit (ASIC) (not shown), for example, and which acts as the printing device's primary controller and data manipulating device for the various hardware components within the print engine 36. The bitmap print data arriving from Queue Manager 34 is received by the core print logic, and at the proper moments is sent in a serialized format to the laser printhead.

The print engine 36 is in communication with a number of paper-handling devices via a communications bus 70. Some of the paper-handling devices depicted on FIG. 1 include three output options 50, 52, and 54, a multipurpose tray 56, a duplexer 58, and two input trays 60 and 62. The output options may vary depending on the particular finish functionality provided by the printing device 10. Examples of output options may include, but are not limited to, a single output bin, a 5-bin multi-bin stacker and/or a single bin stapler finishing option.

As shown, print engine 36 is in communication with radio frequency device controller 38 which is interspersed between the print engine 36 and the output options 50, 52, and 54. In this configuration, the radio frequency device controller 38 may be utilized to intercept commands formulated and transmitted by the printer's core print logic within the print engine 36 to the output options 50, 52, and 54. In addition, the radio frequency device controller 38 may also change commands sent by the core print logic to the output options thereby affecting the operation of the output options 50, 52, and 54. For example, by changing commands to the output options, the radio frequency device controller 38 may cause a specific sheet of media to be directed to a specific one of the output options 50, 52, or 54. In addition, the radio frequency device controller 38 may respond to commands sent by the core print logic to the output options 50, 52, and 54 that mimic the expected response from the output options to the print engine 36. In this way, the radio frequency device controller 38 may be packaged into an aftermarket option that may be installed in a printer, such as printing device 10, without modification of the printer's other essential systems such as print engine 36 including the core print logic.

Figure 2:
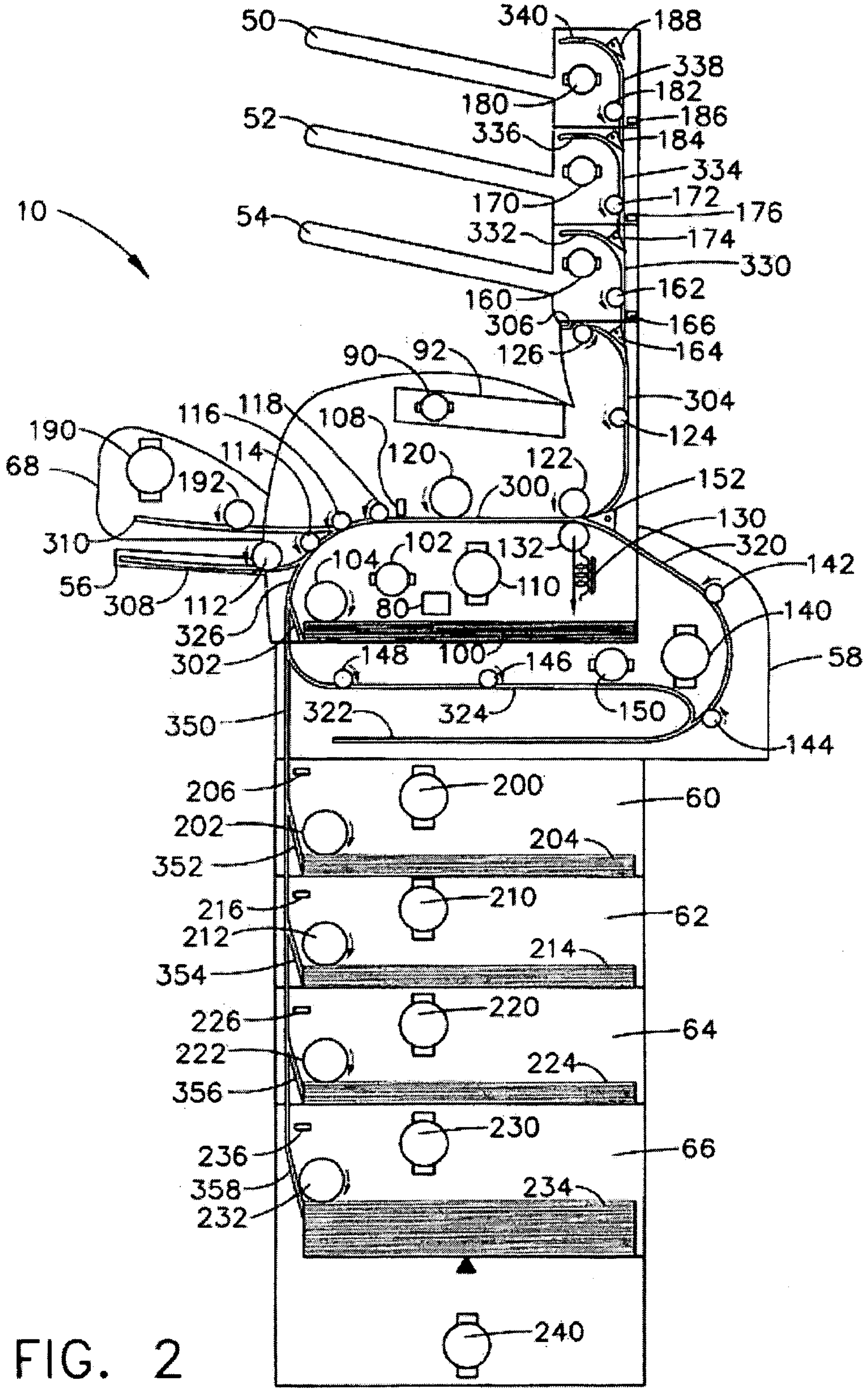
FIG. 2 is a diagrammatic view of the paper path diagram for a laser printer having multiple input trays and multiple output options, as constructed according to the principles of the present invention.

The paper-handling devices and the paper pathways are depicted in greater detail on FIG. 2. Printing device 10 comprises a "base printer" which includes a multipurpose tray 56, an internal input paper tray 100, and several drive devices. These drive devices include a DC motor 102 that drives a pick roller 104, which is used for a picking operation from the internal tray 100. Another DC motor 110 provides the drive for several different rollers within the base printer. These rollers include the pick roller 112 used for feeding print media from multipurpose tray 56, and drive rollers 114, 116, and 118 that transport the print media toward the laser printhead 92 (which is part of print engine 36). The placement and number of drive rollers depicted on FIG. 2 are chosen for the purpose of clarity in this description of the present invention. It will be understood that additional drive rollers would typically be included in an actual implementation of such a printer.

A photoconductive drum 120, which is contained within a print cartridge (not shown), provides transport through the laser printhead area, and fuser rollers 122 and 132 provide transport just before reaching a diverter 152. Output rollers 124 and 126 transport the print media away from the fuser area. If no optional output options are provided within the base printer 10, then the print media automatically follows the pathways 300, 304, and 306, after which the print media exits and lands on an output "tray" at the top surface of the base printer 10. Of course, FIG. 2 is only representative of a single configuration of printing device and it should be understood that the configuration shown can be modified or reconfigured into other printing platforms providing similar functionality.

A DC power supply 12 is included in the base printer 10, which provides power to the DC motors throughout the printer system and preferably is a 24 volt DC supply. This power supply 12 also provides DC power to the microprocessor and other low-voltage components of printer 10 (see FIG. 1).

Another DC motor 90 is included in a laser printhead 92, which provides power to the rotating faceted mirror (not shown) used as part of the laser beam aiming system. A fuser backup roll solenoid 130 is provided to move fuser backup roller 132 away from the heated fuser roller 122 in order to reduce wrinkling of envelopes. On FIG. 2, the duplexer option is installed at 58. A stepper motor 150 provides the mechanical drive for the diverter 152 which is used to either allow the print media to travel to the output portion of the printer (along pathway 304), or to divert the paper into the duplexer along pathway 320. If the print media is diverted into the duplexer 58, then DC motor 140 provides the mechanical drive to rollers 142,144,146, and 148. The print media travels pathways 320, 322, and 324, before being returned into the input pathway at 326. If the sheet of print media was originally picked from the internal tray 100, it would have first followed the pathway 302, then under the photoconductive drum 120 via pathway 300, before entering the duplexer. After the sheet entered the pathway 322, it would then be turned upside down by being transported through pathway 324 before arriving back at the input pathway 326.

The base printer 10 also includes multipurpose tray 56, and print media could enter the input pathway 326 from the multipurpose tray's pathway 308, using the roller 112 which is driven by DC motor 110. An optional envelope feeder 68 is also depicted on FIG. 2, which allows an envelope to be used as the print media. The envelope would follow the pathway 310 while being transported by a roller 192, which is powered by a DC motor 190.

The base printer 10 also includes at least one paper (or other type of print media) positioning sensor, as seen at the reference numeral 108. Of course, other paper sensors can be included in printer 10 at various locations, without departing from the principles of the present invention. In many cases, the paper positioning sensors preferably are optoelectronic devices, which have a light source that typically is a light emitting diode (LED). This provides a means for sensing the position of a sheet of paper or other print media and provides a way of determining when the leading edge or trailing edge of a sheet of print media has reached a particular point along the media pathway.

FIG. 2 also depicts several other optional input trays 60, 62, 64, and 66. Input tray 60 includes a DC motor 200 which drives a pick roller 202 that can pick a sheet of print media from the tray 204. The print media, once picked, follows a pathway 352 and becomes sensed by a print media sensor 206 as the sheet approaches the input pathway 350.

The input tray 62 includes a DC motor 210 which drives a pick roller 212 that picks a sheet of print media from the tray 214. Once picked, the print media is transported along a pathway 354, past a paper positioning sensor 216, and ultimately arrives in the input pathway 350. Input tray 64 includes a DC motor 220 which provides the drive to a pick roller 222. Pick roller 222 can pick a sheet of print media from the tray 224, and this print media follows a pathway 356 which directs the print media past a sensor 226.

Input tray 66 is an optional high capacity tray and includes a stepper motor 240 (which alternatively could be a DC motor) that can position the stack of print media at 234 so that it feeds properly into the pathway 358. Input tray 66 includes a DC motor 230 which provides drive to a pick roller 232. Once a sheet of print media is picked, it is transported along pathway 358 past a paper positioning sensor 236, and ultimately arrives at the input pathway 350.

FIG. 2 also depicts several optional output options, such as stackers 50, 52, and 54. Stacker 54 includes a stepper motor 160 (which alternatively could be a DC motor) that provides mechanical drive to a roller 162, and a diverter 164. If a sheet of print media that exits the printhead area is to be transported into the output option 54, then diverter 164 must be actuated to a position which directs the print media along the pathway 330 instead of the pathway 306. The output option 54 also includes a paper positioning sensor 166. Once the print media is transported along the pathway 330, it will then exit along pathway 332 into the output option 54.

Output option 52 operates in a similar fashion, and includes a stepper motor 170 (which alternatively could be a DC motor). This motor provides mechanical drive to a roller 172 and a diverter 174. A paper positioning sensor 176 is also provided as part of stacker 52. If a sheet of print media is to be exited at output option 52, then diverter 174 may be positioned to prevent the print media from entering the pathway 332, and instead directs the print media along pathway 334, finally exiting via pathway 336.

The top output option 50 includes a stepper motor 180 (which alternatively could be a DC motor), which provides mechanical drive to a roller 182 and a diverter 184. A paper positioning sensor is also provided at 186. For print media to exit the output option 50, diverter 184 must be actuated to prevent the print media from exiting pathway 336, and instead directing the print media to follow the pathway 338 and exit via the pathway 340. A final diverter 188 is also depicted on FIG. 2, but would not be used unless a further output option were added.

Figure 3:
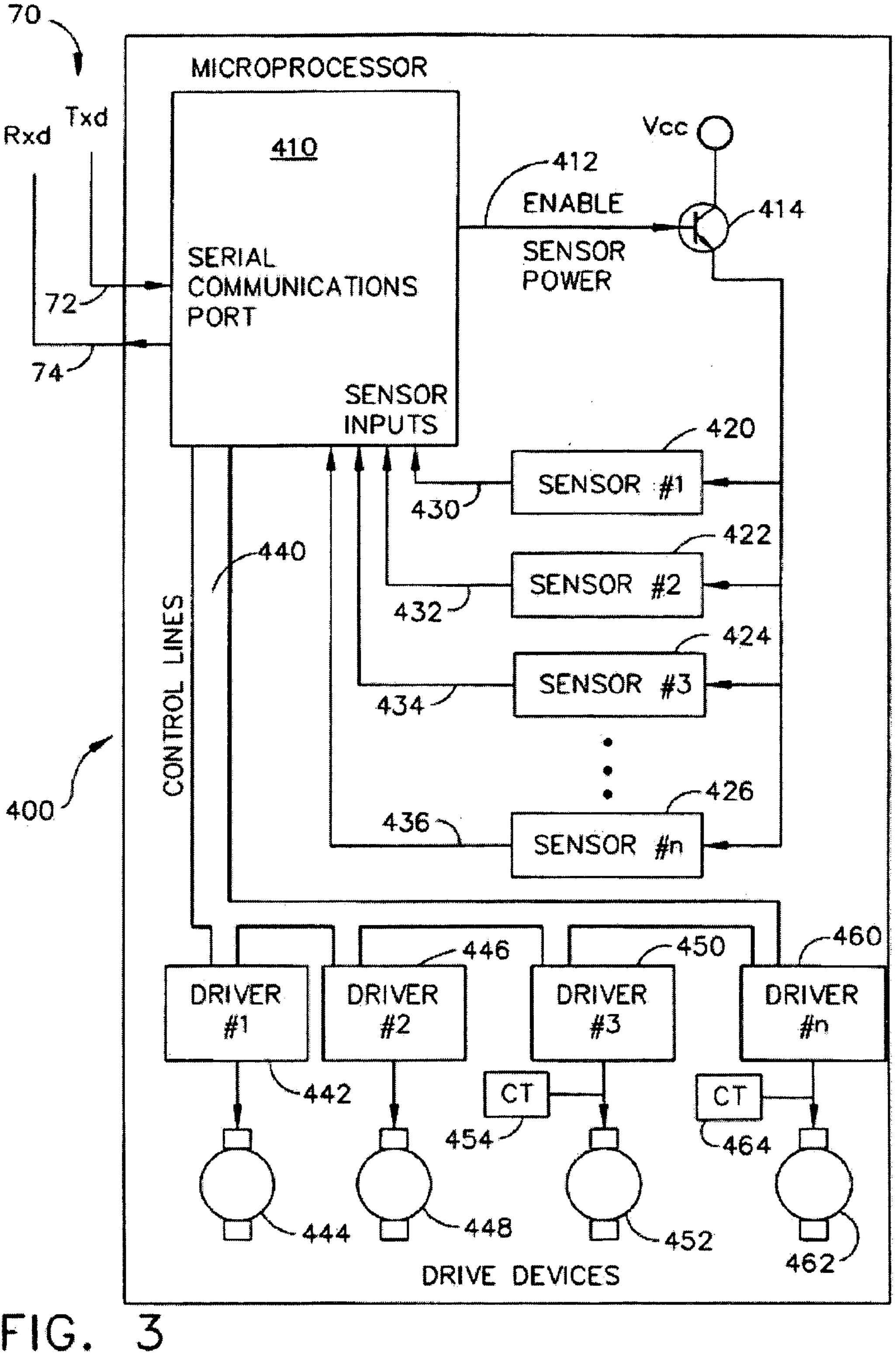
FIG. 3 is a block diagram of the main electrical components that are found in one of the paper-handling devices, such as an input tray, found on FIG. 2.
Figure 4:
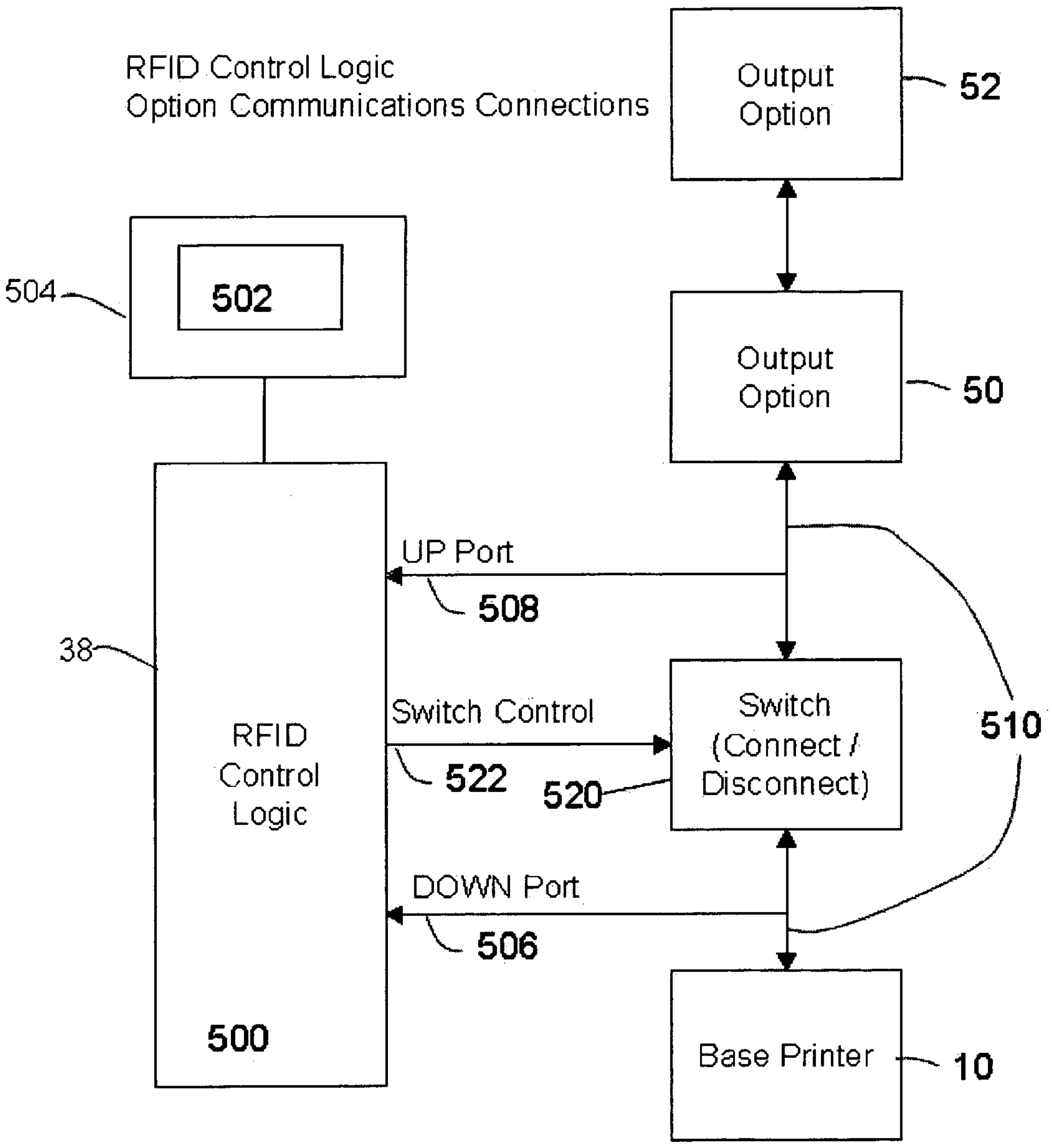
FIG. 4 is a block diagram showing a paperport connection of the signal connection scheme according to one example of the present invention.

FIG. 3 shows the main components of one of the optional paper-handling devices depicted on FIG. 2. FIG. 3 depicts a fairly complicated paper-handling device, since it illustrates several positioning sensors and several different drive motors. Many paper-handling devices are not as complicated and do not have the number of sensors or drive devices as shown on FIG. 3. One type of duplexer, for example, manufactured by Lexmark International, Inc. contains two optical positioning sensors and two drive devices, such as a stepper motor 150 and a DC motor 140, respectively. The communications bus 70 comprises a transmit data line 72 and a receive data line 74. These data lines are connected into a microprocessor 410, via a serial communications port. Microprocessor 410 includes hardware inputs and outputs, and a single microcontroller integrated circuit could be used for microprocessor 410.

It will be understood that many various types of motors or drive inducing devices can be used in a paper-handling device such as the device 400 on FIG. 3 without departing from the principles of the present invention. Furthermore, it will be understood that many different types of paper positioning sensors can be used other than optoelectronic devices, without departing from the principles of the present invention. Other types of sensors can be used in a printer, such as a limit switch to detect whether or not the printer cover is closed.

By use of the communications bus 70, the print engine 36 is able to command any of the paper-handling options, such as the input trays or output options to perform a function by simply sending a command to that particular device. Such commands preferably are in the form of a data message which includes the appropriate address of the paper-handling device for which the message is intended. The two-wire serial bus 70 is used when the print engine 36 sends a command to one of the paper-handling devices to start. In return, the paper-handling device sends a status response, which acknowledges that the command was received and that the paper-handling device has responded accordingly. Since the print engine can control precisely when it desires each of the paper-handling devices to operate, print engine 36 may control the start commands for these devices such that their peak power consuming operations do not overlap in time, at least for certain operations. For example, when the printer system is first powered on, the printer and its paper-handling devices may re-initialize many or all of their subsystems. The printer may run its transport motor and the laser printhead motor, while the duplexer and output options may home their mechanisms, which involves running their transport motors. In one instance, the duplexer 58 may home its mechanism only after it receives a "Mechanical Reset" command from print engine 36. Print engine 36 then polls duplexer 58 with a "Query Reset Complete" command, and duplexer 58 will indicate when it has finished its mechanical reset operations by a response to this command.

Having described the paper handling and output options mechanisms of a printer, such as printing device 10, the invention provides a way of using such mechanisms to separate pages of cut-sheet media embedded with radio frequency device tags such as, for example, a Radio Frequency Identification (RFID) tag according to the working status of a tag or tags contained on the media. In this way, the printing device 10 can separate media with defective or "bad" tags from media with "good" tags during the printing process without otherwise disturbing the normal operation of the printer.

In a typical printer system with multiple output bins, such as printing device 10, the destination bin for each page may be specified either by default from a printer default setting, or specifically page-by-page or job-by-job by the driver or application software sending the print job. Some printers are designed so that the printer may change the destination of each sheet on a page-by-page basis based upon the above given job information. The output destination decision may be made as the page is submitted for printing, and the attached output options may be given the appropriate operation commands to direct the page to its destination bin at the appropriate times as each page moves through the printer.

Figure 5:
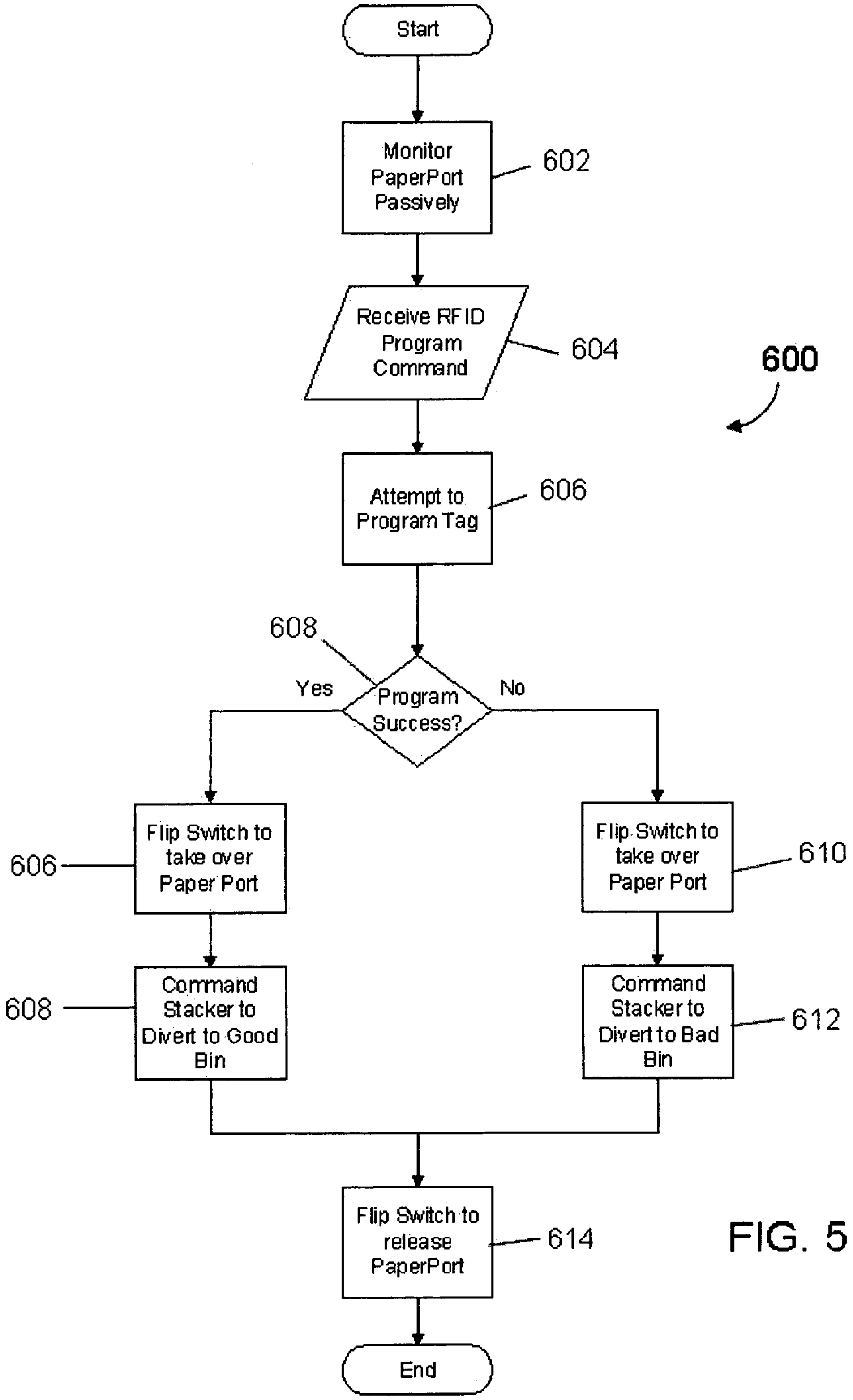
FIG. 5 is a process flow diagram for a method of detecting and redirecting media having a defective radio frequency device tag to a specific output option according to the invention.

In an RFID printing scheme, the detection of "good" vs. "bad" media may happen at a point in the printing process much later than the usual destination bin decision point. To solve the problem of separating "bad" RFID media from "good" RFID media, the normal communications scheme between core engine and the output options is modified so that the RFID control logic can intercept and change the commands being sent to the output options, while sending responses to the engine that mimic the expected responses from the output options. FIG. 5 shows that the RFID control logic 500 may be configured to redirect "good" tags to one output option, such as output option 50, and "bad" tags to a second output option 52.

Media having no tags at all (for example, a non-RFID job submitted in between two RFID jobs) can be sent to a third bin, to physically separate them from RFID pages, or they can be forwarded to the "good" bin. Generally, non-RFID pages will not trigger a response from the RFID logic 500, and will be sent to the user-specified bin via the normal procedures.

Thus, a system for separating media having one or more defective radio frequency device, such as one or more bad RFID tags, may comprise a base printer 10, with RFID control logic 500 as part of a radio frequency control subsystem 38, and two or more output options 50, 52 installed. The output options may comprise any of the existing finish options, or a new design that could be forthcoming since the control logic 500 would not interfere with normal printer functions. Typically, the trailing edge of a sheet of radio frequency device tag embedded media must be able to clear the location of installed RF antenna 502 before the leading edge of that sheet reaches the diverter for the lowest output bin into which the sheet may be diverted based upon the "good/bad tag" decision. The RF antenna 502 may be used by a radio frequency reader/programmer 504 to read and/or program a radio frequency device tag in order to confirm whether a tag is working or defective.

The RFID control subsystem 38 may have a pair of communications ports 506, 508 connected to the output side of the options control communications channel 510 which is sometimes referred to as the "Paper Port." The communications ports 506, 508 may be connected to the channel 510 in such a way that one port 506 can communicate "down" to the base printer 10 and the other port 508 can communicate "up" to the output options 50, 52. During normal operation, these ports 506, 508 may be configured so that they do not interfere with direct communication between the base printer 10 and the output options 50, 52. A switch 520 may be used to facilitate the flow of communications between the base printer 10 and the output options 50, 52 or the base printer 10 to the radio frequency control subsystem 38 to the output options 50, 52 in the "up" direction as well as from the output options 50, 52 to the subsystem 38 and to the base printer 10 in the "down direction" as shown.

Thus, the printer's control logic within the print engine 36 may cause media to be transported through the input side of the printer's paper path and into the printing station. At the programming antenna location 504, the radio frequency control logic 500 may attempt to read and/or program a tag embedded in the media and then note the success or failure of this attempt. The radio frequency control logic 500 may then monitor or "listen" on its communications port to track the page's location as it moves through the printer. At the appropriate time, the radio frequency control logic 500 may disconnect the base engine from the upper options, via switch control 522 and switch 520 for example, and may then activate communications ports 506, 508.

Using the "down" port 506, the radio frequency control logic 500 may then intercept and respond to commands sent by the printer engine 36, mimicking the expected response from the addressed option, either 50 or 52, for example. At the same time, the radio frequency control logic 500 uses the "up" port 508 to send commands to the upper option devices so that they divert the paper to the desired "good" or "bad" bin. Once the paper diversion is complete, the radio frequency control logic 500 returns its communications ports to their passive state and allows the printer engine 36 to communicate directly with the output options.

An alternate embodiment would have print engine 36 and radio frequency device controller 38 communicating with each other in order to negotiate the diversion of media. For example, print engine 36 may be configured to interface and/or "know" something about the operations of the radio frequency device controller 38. In this case, print engine 36 can knowingly defer the decision of which output option 50, 52, or 54 to use to the radio frequency device controller 38, thereby allowing the radio frequency device controller 38 to control the diversion process and divert media at the right time. Alternatively, the print engine 36 can query the controller 38 and negotiate the responsibility for diverting media depending on the specific capabilities of the print engine 36 and controller 38, the most efficient use of either device, or other relevant considerations. This removes the need for the switch 520 and requires the print engine 36 know what is "going on", but still has the controller 38 making the divert decision.

As would be understood by those of ordinary skill, this alternate embodiment may be implemented by making the radio frequency device controller 38 take the form of a new device on the existing "Paper Port" communications pipe with communications between the engine 36 and the controller 38 supported by a few new software commands to handle the handshaking between the two devices.

FIG. 5 is a flow diagram for a process, denoted generally as 600, of detecting and redirecting media having a defective radio frequency device, such as an RFID tag, to a specific one of two or more output options, such as output options 50, 52, according to the invention. Process 600 begins at step 602 wherein the control logic 500 may first monitor the options control communications channel until a sheet of media containing a tag is detected. Then, a program command will be generated and received by the control logic, step 604, whereupon the RF control logic will attempt to program the tag, step 606, in order to determine if the tag is defective or working properly.

If the program attempt was successful (as determined at block 608), process flow is directed to step 606 in order to divert media with a "good" tag to a specified output option. Thus, at step 606, the switch 520 may be operated to cause RF logic control 500 to intercept messages from the base printer and to change such messages, if necessary, in order to communicate with the installed options and cause the media to be diverted to a "good" output option, step 608.

A similar sequence of steps, 610, 612, may take place to divert media having one or more defective or "bad" tags as determined at block 608. Thus, at step 612 the print stacker is operated to cause it to divert such media to a specific one of the output options 50, 52. In either case, switch 520 can be operated to release the paperport allowing communications to flow normally between the base printer and the installed output options.

It should be understood that modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system for separating media having one or more defective radio frequency data storage devices from other media during a printing process comprising:

a printing device including a print engine with core print logic, at least two output options and at least one diverter for directing media to either one of said two output options; and a radio frequency controller interspersed between said core print logic and said output options and having control logic for performing a set of radio frequency control functions;

wherein said radio frequency controller and said print engine are arranged to cause media with one or more defective radio frequency data storage devices to be directed to a specific one of said two output options.

2. The system of claim 1 wherein said radio frequency controller causes media with a defective radio frequency data storage device to be diverted by intercepting commands being sent to said output options from said core print logic.

3. The system of claim 2 wherein said radio frequency controller further generates responses to said core print logic that mimic expected responses from said output options.

4. The system of claim 1 wherein said printing device further comprises a switch for diverting communications between said printing device and said output options to said radio frequency controller.

5. The system of claim 4 further comprising a Radio Frequency Identification (RFID) antenna operably coupled to said radio frequency controller.

6. The system of claim 5 further comprising a RFID programmer operably coupled to said radio frequency controller for programming radio frequency device tags on media transported through said printing device.

7. The system of claim 6 wherein said radio frequency controller further comprises a first communications port operably coupled to said printing device and a second communications port operably coupled to said output options.

8. The system of claim 7 wherein said radio frequency controller causes said radio frequency programmer to write data to a radio frequency device tag on media to determine if the tag is defective or in working condition.

9. The system of claim 1 wherein said at least two output options are selected from the group consisting of: a single output bin, a 5-bin multi-bin stacker and a single-bin stapler finishing option.

10. The system of claim 1 wherein said print engine and said radio frequency controller negotiate the responsibility for diverting media with defective radio frequency data storage devices to a specific one of said two output options.

11. The system of claim 10 wherein said print engine knowingly allows said radio frequency controller to control the diversion of media.

12. The system of claim 10 wherein said radio frequency controller comprises a device on an existing Paper Port communications pipe between said print engine and said radio frequency controller.

13. A device for use in a printer having core logic and two or more output options, the device facilitating the detection and redirection of media having a defective radio frequency device tag to a specific output option, the device comprising:

a radio frequency device tag programmer;

a first port operably coupled to the printer's core print logic;

a second port operably coupled to the output options; and a radio frequency device controller operably coupled to said programmer for reading and/or writing data to radio frequency device tags on media transported through said printer for determining if a radio frequency device tag is defective or in working condition;

wherein said radio frequency device controller communicates with said printer and said output options to cause media containing a defective radio frequency device tag to be directed to a specific one of said output options.

14. The device of claim 13 wherein said radio frequency device tag programmer includes an antenna for communicating with radio frequency device tags.

15. The device of claim 13 further comprising a switch for connecting and disconnecting communications between said printer and said output options.

16. The device of claim 15 further comprising a switch control port operably coupled to said switch for diverting communications between said printer and said output options through said radio frequency device controller.

17. The device of claim 16 wherein said radio frequency device controller causes said switch control port to operate said switch and divert communications between said printer and said output options through said radio frequency device controller when a defective radio frequency device tag is detected.

18. The device of claim 17 wherein said radio frequency device controller intercepts instructions transmitted by said printer to said output options, changes the instructions and communicates them to said output options in order to control the path of media to a specific one of said output options.

19. The device of claim 17 wherein said radio frequency device controller transmits messages to said printer that mimic the responses the printer would receive from said output options.

20. The device of claim 13 wherein said device comprises an aftermarket option that can be installed in said printer without modifications to the printer's core print logic.

21. Within a printer having two or more output options, a method of detecting and redirecting media having a defective radio frequency device tag to a specific output option, the method comprising the step of:

detecting a defective radio frequency device tag contained on a cut sheet of print media;

in response to detecting a defective radio frequency device tag redirecting the flow of instructions from the printer to the output options to a radio frequency device controller;

the radio frequency device controller causing the media containing the defective radio frequency device tag to be directed to a specific one of said output options.

22. The method of claim 21 further comprising the step of the radio frequency device controller transmitting at least one instruction to an output option of the printer.

23. The method of claim 22 further comprising the step of the radio frequency device controller transmitting at least one message to the printer, the message mimicking the response an output option would send after receiving said one instruction.

24. The method of claim 21 further comprising the step of the radio frequency device controller diverting the path traversed by said media within said printer.

25. The method of claim 21 wherein said detecting step is performed by a radio frequency device controller reading or writing data to a radio frequency device tag.

26. The method of claim 21 further comprising the step of said radio frequency device controller causes said printer to communicate directly with the output options once the media containing the defective radio frequency device tag has been directed to a specific one of said output options.

* * * * *